Figure 1:
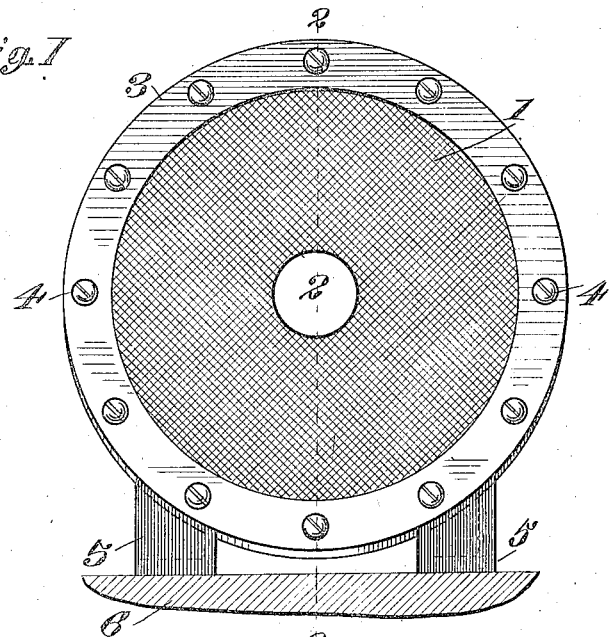

Nov. 6, 1923.  1,473,021
A. L. DUNCAN
MEANS FOR PEELING FRUIT
Filed Oct. 14, 1922

Inventor,
Arthur L. Duncan
By Acker & Jollen
his attorneys.

Patented Nov. 6, 1923.

1,473,021

UNITED STATES PATENT OFFICE.

ARTHUR L. DUNCAN, OF OAKLAND, CALIFORNIA.

MEANS FOR PEELING FRUIT.

Application filed October 14, 1922. Serial No. 594,553.

*To all whom it may concern:*

Be it known that I, ARTHUR L. DUNCAN, a citizen of the United States, residing at Oakland, in the county of Alameda and State of California, have invented certain new and useful Improvements in Means for Peeling Fruit, of which the following is a specification.

The hereinafter described invention relates to the means for the removal of the peel or skin of previously treated pears, preparatory to the canning thereof. By the expression "previously treated pears" is meant that the pears have been treated with means for softening or disintegrating the skin thereof, and therefore the present invention resides in the means for the removal of the softened or disintegrated peel from such class of fruit, or such other fruit as may be treated under the present invention.

It is at presnt the practice in the treatment of pears for the softening of the skin and the removal of the softened skin therefrom, it has been customary either to pass the fruit to be canned through a caustic bath or subjecting the same to a heating medium such as steam, by passing the fruit through a heating or steaming chamber. Either of these steps soften or disintegrate the skin of the fruit, and which thereafter is subjected to a washing action for the removal of the softened skin. Pears are an exceedingly delicate fruit and the greatest care must be exercised to prevent the meat of the fruit from oxidizing or becoming dark in color, it being particularly desirable that the meat of the fruit be maintained in its whitened condition; even with the best of care, however, the meat of the fruit will oxidize while being passed through the heating chamber for the softening of its skin and after the flesh of the fruit has once oxidized, such darkening of the flesh is not overcome by subjecting the same to a washing action either of pure water or a saline solution.

I have discovered that if the skin of the fruit be perliminarily treated for the softening of the skin thereof by subjecting the fruit either to the action of a caustic solution or to the action of a heated temperature, and the fruit when removed therefrom be subjected to mechanical means which by frictional engagement with the fruit will remove the softened skin and perhaps the outer layer of the meat, the pears so treated may be immediately canned and maintained so far as its flesh or meat is concerned, in a condition of whiteness.

The preferred embodiment of the means for removing the softened skin from the previously treated fruit comprises a flexible perforated diaphragm, the diameter of the aperture of which being considerably less than the diameter of the treated fruit to be acted upon, the said perforated diaphragm is supported or held in position in any suitable manner and so arranged that through the aperture thereof the fruit to be treated is forcibly passed.

The mechanical peeling means will be readily understood by reference to the accompanying sheet of drawings, wherein Fig. 1 is a front view in elevation of the means as arranged and designed for use in its simplest form.

Figure 2:
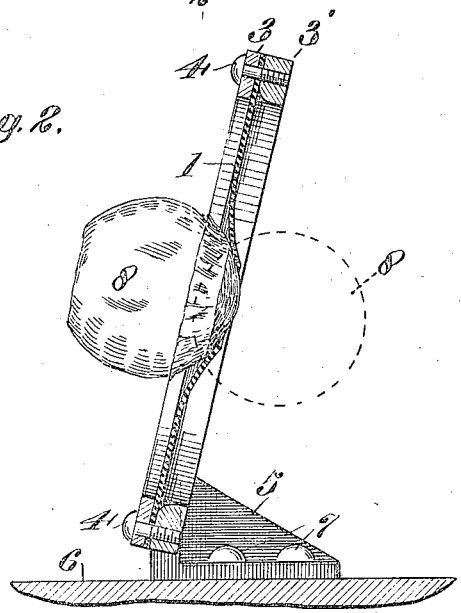

Fig. 2 is a vertical sectional view taken on the line 2—2, Fig. 1 of the drawings, disclosing a treated fruit as being passed through the aperture of the elastic or flexible diaphragm.

In the drawings, the numeral 1 is used to indicate a flexible diaphragm, preferably composed of rubber, which is provided centrally with an aperture indicated by the numeral 2 through which the fruit to be treated is forcibly passed. In its preferred embodiment the diaphragm 2 is mounted and secured between the metallic ring plates 3 and 3', which are united and held together by means of the screw bolts 4, this ring-like structure being supported by the base member or supporting structure 5, which is formed or cast integral with the ring member 3', and which base structure 5 is held to or secured to a table or operating bench 6 by means of the screws 7, the disposition of the ring member 3' relative to the base structure 5 being such that the ring member 3' stands at a slight inward inclination to the horizontal. The aperture 2 of the diaphragm 1 is of a diameter less than the diameter of the fruit to be passed therethrough, with the result that as pressure is exerted upon the fruit 8 to force the same through the aperture 2 of the diaphragm 1 the surface of the fruit is surrounded and embraced by the peripheral wall of the said aperture 2 of the diaphragm 1, which serves to squeeze or press the loosened or disintegrated skin or peel from the surface of the fruit.

It will be understood that prior to subjecting the fruit to the action of the peeling device the same is subjected to a preliminary treatment for the softening or disintegrating of the peel or skin thereof and which softening or disintegration is accomplished by subjecting the fruit to the application of softening means, which application is ordinarily through the medium of steam, that is to say, the fruit to be treated is first passed through a steaming chamber, and as carried through said chamber steam is applied to the fruit in the form of a plurality of steam jets. Any suitable type of steaming or softening apparatus common to the art may be employed for giving the preliminary treatment to the fruit, which fruit after leaving the steaming or softening means is received and forcibly passed through the aperture 2 of the elastic diaphragm or shield member 1 of the peeling means, the aperture of which, as the fruit is passed therethrough, gradually giving or expanding to the size or diameter of the fruit and wiping or removing from the surface thereof the softened or disintegrated skin.

In the present application the mechanical means for removing the softened skin from the preliminarily treated fruit is shown and illustrated in its simplest form, but it will be understood that any suitable form of pressure means may be employed for the peeling purpose just so long as the same is provided with a flexible diaphragm or shield member through which the preliminarily treated fruit is passed through an aperture thereof by pressure applied to the fruit.

The device is mainly designed for the removal of the loosened or softened outer skin or peel from pears, although it is equally as well adapted for the treatment of any fruit, the skin of which is first softened or loosened and which possesses sufficient solid flesh to withstand the pushing strain necessary for the forcing of the fruit through the aperture 2 of the elastic diaphragm or shield member 1.

By the use of the present invention the fruit may be deposited into the cans or containers as the same is discharged from within the aperture 2 of the diaphragm or shield member 1, thereby maintaining the fruit from exposure to the atmosphere and by so doing preventing or avoiding the oxidizing of the peeled pears, which is a desirable feature where the fruit to be treated is of that character that the desire is to preserve the whiteness thereof and which is particularly true relative to pears utilized for canning purposes, the flesh of which discolors readily after the removal of the loosened or disintegrated skin or peel unless they are quickly placed within the can or container for canning purposes.

Having thus described my invention, what I claim as new and desire to secure by Letters Patent of the United States, is:

The means for gradually separating softened skin from previously treated fruit, the same comprising a relatively thin flexible elastic diaphragm provided with a perforation having a continuous unbroken edge and through which perforation the fruit is adapted to be forced whereby the aperture wall uniformly engages the surface of the fruit as the same passes therethrough, and an open frame peripherally engaging the diaphragm at a distance from the aperture wall for maintaining the diaphragm in fixed position and enabling the ready flexing of the diaphragm on the passing of the fruit through the aperture thereof.

In testimony whereof I have signed my name to this specification.

ARTHUR L. DUNCAN.